United States Patent
Falco (10) Patent No.: US 9,558,035 B2
(45) Date of Patent: Jan. 31, 2017

(54) SYSTEM AND METHOD FOR SUPPORTING ADAPTIVE BUSY WAIT IN A COMPUTING ENVIRONMENT

(71) Applicant: Oracle International Corporation, Redwood Shores, CA (US)

(72) Inventor: Mark A. Falco, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 30 days.

(21) Appl. No.: 14/449,357

(22) Filed: Aug. 1, 2014

(65) Prior Publication Data

US 2015/0169367 A1   Jun. 18, 2015

Related U.S. Application Data

(60) Provisional application No. 61/917,709, filed on Dec. 18, 2013.

(51) Int. Cl.
| | |
|---|---|
| G06F 9/46 | (2006.01) |
| G06F 9/48 | (2006.01) |
| G06F 1/32 | (2006.01) |
| G06F 9/54 | (2006.01) |

(52) U.S. Cl.
CPC .......... *G06F 9/4881* (2013.01); *G06F 1/3296* (2013.01); *G06F 9/485* (2013.01); *G06F 9/544* (2013.01); *G06F 9/546* (2013.01)

(58) Field of Classification Search
None
See application file for complete search history.

(56) References Cited

U.S. PATENT DOCUMENTS

| | | | | |
|---|---|---|---|---|
| 6,341,347 B1 * | 1/2002 | Joy | ........................ | G06F 9/3851 |
| | | | | 711/E12.043 |
| 6,965,961 B1 * | 11/2005 | Scott | ........................ | G06F 9/52 |
| | | | | 710/200 |
| 7,383,368 B2 * | 6/2008 | Schopp | ................... | G06F 9/526 |
| | | | | 710/200 |
| 7,509,671 B1 * | 3/2009 | Bedell | ................... | G06F 9/5038 |
| | | | | 718/102 |
| 8,522,192 B1 * | 8/2013 | Avalos | ......................... | 717/100 |

(Continued)

OTHER PUBLICATIONS

Andrea C. Arpaci-Dusseau et al., "Scheduling with Implicit Information in Distributed Systems", Proceedings of the 1998 ACM Sigmetrics Joint International Conference on Measurement and Modelng of Computer Systems, Jun. 22, 1998, 11 pages.

(Continued)

*Primary Examiner* — Emerson Puente
*Assistant Examiner* — Mehran Kamran
(74) *Attorney, Agent, or Firm* — Tucker Ellis LLP (57) ABSTRACT

A system and method can support queue processing in a computing environment such as a distributed data grid. A thread can be associated with a queue in the computing environment, wherein the thread runs on one or more microprocessors that support a central processing unit (CPU). The system can use the thread to process one or more tasks when said one or more tasks arrive at the queue. Furthermore, the system can configure the thread to be in one of a sleep state and an idle state adaptively, when there is no task in the queue.

20 Claims, 5 Drawing Sheets

(56) References Cited

U.S. PATENT DOCUMENTS

| | | | | |
|---|---|---|---|---|
| 2001/0018701 | A1* | 8/2001 | LiVecchi | G06F 9/4881 718/105 |
| 2001/0054020 | A1* | 12/2001 | Barth | G06F 17/30867 705/37 |
| 2002/0007387 | A1* | 1/2002 | Ginsberg | G06F 1/3228 718/102 |
| 2003/0208521 | A1* | 11/2003 | Brenner | G06F 9/4881 718/103 |
| 2003/0236816 | A1* | 12/2003 | Venkatasubramanian | G06F 9/526 718/107 |
| 2004/0019891 | A1* | 1/2004 | Koenen | G06F 9/5044 718/102 |
| 2005/0080963 | A1* | 4/2005 | Schopp | G06F 9/526 710/200 |
| 2005/0203873 | A1* | 9/2005 | McDonald | G06F 17/30575 |
| 2007/0044104 | A1* | 2/2007 | Beatty | G06F 9/526 718/108 |
| 2007/0074219 | A1* | 3/2007 | Ginsberg | G06F 1/3203 718/102 |
| 2007/0101333 | A1* | 5/2007 | Mewhinney | G06F 9/485 718/102 |
| 2007/0282928 | A1* | 12/2007 | Jiao | G06F 9/485 |
| 2007/0300227 | A1* | 12/2007 | Mall | G06F 9/3851 718/102 |
| 2008/0104610 | A1* | 5/2008 | Norton | G06F 11/3419 718/108 |
| 2009/0150898 | A1* | 6/2009 | Sohn | G06F 9/5066 718/105 |
| 2009/0217276 | A1* | 8/2009 | Brenner | G06F 9/4856 718/102 |
| 2009/0328053 | A1* | 12/2009 | Dice | G06F 9/526 718/104 |
| 2012/0054472 | A1* | 3/2012 | Altman | G06F 11/3419 712/219 |
| 2012/0311544 | A1* | 12/2012 | Higgs | G06F 11/3466 717/130 |
| 2013/0166941 | A1* | 6/2013 | Kato | G06F 1/14 713/502 |
| 2013/0318537 | A1* | 11/2013 | Rogers | G06F 9/50 718/104 |
| 2014/0181285 | A1* | 6/2014 | Stevens | H04L 67/322 709/223 |
| 2014/0351231 | A1* | 11/2014 | McKenney | G06F 17/30171 707/704 |
| 2014/0373020 | A1* | 12/2014 | Govindarajeswaran | G06F 9/505 718/102 |
| 2015/0052529 | A1* | 2/2015 | Benhase | G06F 9/526 718/102 |
| 2015/0058858 | A1* | 2/2015 | Plattner | G06F 9/4881 718/103 |

OTHER PUBLICATIONS

Stefanos N. Damianakis et al., "Reducing Waiting Costs in User-Level Communication Princeton University Technical Report, TR-525-96", 11 pages.

European Patent Office, International Searching Authority, International Search Report and Written Opinion dated Mar. 9, 2015 for International Application No. PCT/US2014/068661, 14 pages.

* cited by examiner

SYSTEM AND METHOD FOR SUPPORTING ADAPTIVE BUSY WAIT IN A COMPUTING ENVIRONMENT

CLAIM OF PRIORITY

This application claims priority on U.S. Provisional Patent Application No. 61/917,709, entitled "SYSTEM AND METHOD FOR SUPPORTING ADAPTIVE BUSY WAIT IN A COMPUTING ENVIRONMENT" filed Dec. 18, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to thread management in a computing environment.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can support queue processing in a computing environment such as a distributed data grid. A thread can be associated with a queue in the computing environment, wherein the thread runs on one or more microprocessors that support a central processing unit (CPU). The system can use the thread to process one or more tasks when said one or more tasks arrive at the queue. Furthermore, the system can configure the thread to be in one of a sleep state and an idle state adaptively, when there is no task in the queue.

DETAILED DESCRIPTION

Described herein are systems and methods that can support queue processing in a computing environment.
Distribute Data Grid In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

Figure 1:
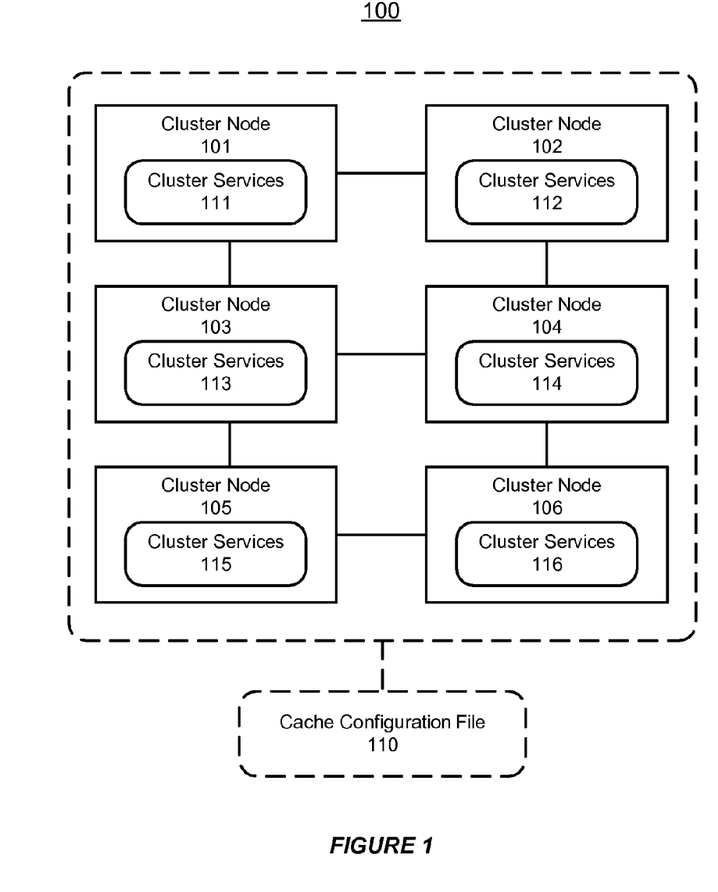
FIG. 1 is an illustration of a data grid cluster in accordance with various embodiments of the invention.

FIG. 1 is an illustration of a data grid cluster in accordance with various embodiments of the invention. As shown in FIG. 1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

Queue Processing Wait

Figure 2:
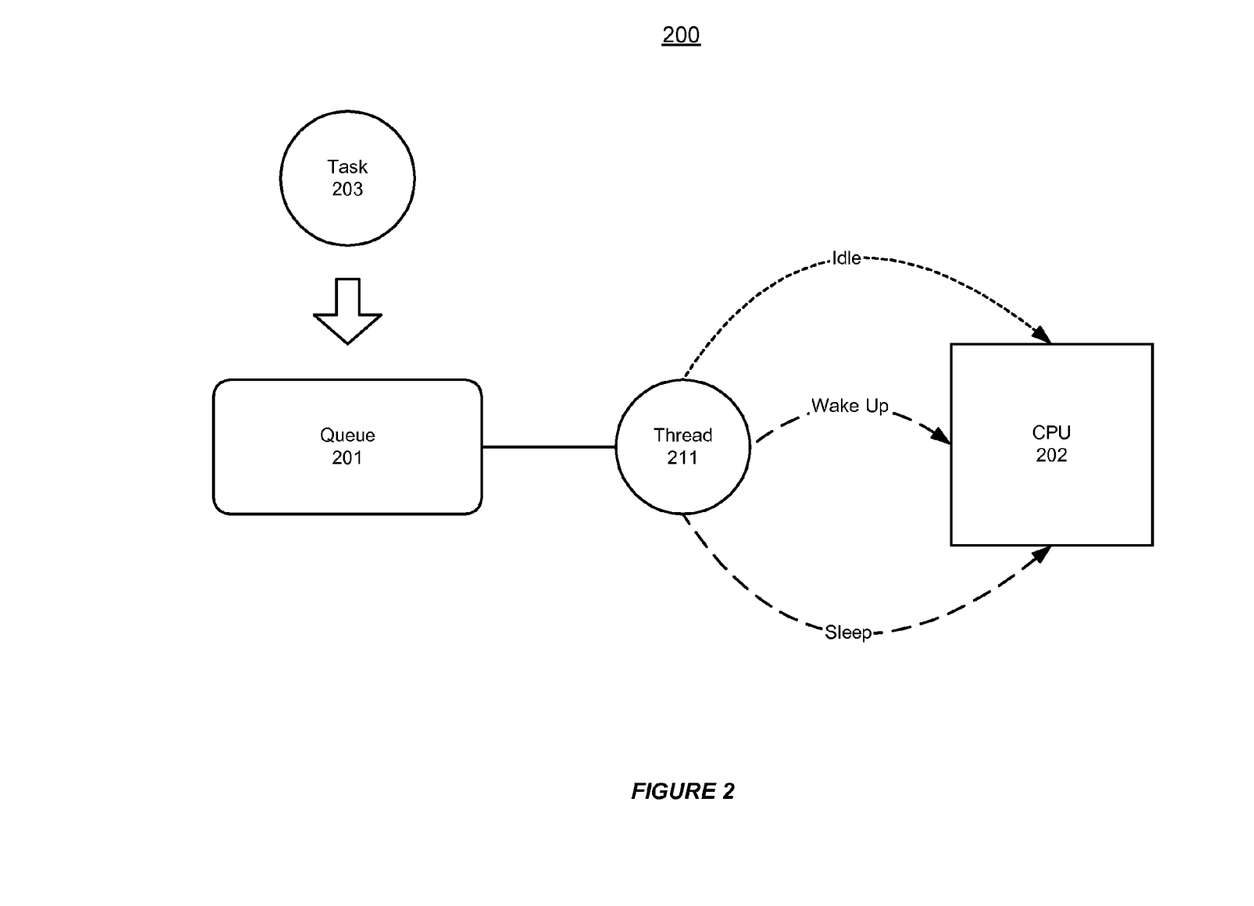
FIG. 2 shows an illustration of supporting queue processing in a computing environment, in accordance with an embodiment of the invention.

FIG. 2 shows an illustration of supporting queue processing in a computing environment, in accordance with an embodiment of the invention. As shown in FIG. 2, a computing environment 200, such as a distributed data grid, can use one or more threads (e.g. the thread 211) to support queue processing. The thread 211 can be responsible for handling various tasks arriving at a queue 201, e.g. in order to support a messaging bus that is based on a distributed data grid.

Furthermore, when there is no task in the queue 201, the system allows the thread 211 to wait until the next task (e.g. the task 203) arrives at the queue 201. The thread 211 can be configured into different states (i.e. using different strategies), while waiting for the arrival of the task 203.

In accordance with an embodiment of the invention, the thread 211 can be configured in an idle state, where the system can spin the CPU 202 (i.e. the CPU may not be switched to run another thread). By spinning the CPU 202 while waiting, the system can use the thread 211 to handle the task 203 as soon as a new task 203 arrives at the queue 201. Thus, the system can achieve low latency and high performance.

As a trade-off, CPU time may be wasted when the thread 211 is in an idle state, since the CPU 202 may not be switched to run other threads when the CPU 202 is spinning. Thus, this approach is favorable when the work load is heavy and the interval time between two consecutive tasks tends to be short.

Alternatively, the thread 211 can be put in a sleep state, in which case the CPU 202 is allowed to switch to run another thread until the thread 211 is awakened, e.g. when a task 203 arrives at the queue 101.

On the other hand, using this second approach, the system needs to perform two operations (i.e. a first operation to put the thread 211 to sleep and a second operation to wake the thread 211 up) in order to use the thread 211 for queue processing.

Thus, this approach is favorable when the interval time between two consecutive tasks is longer than the total CPU time spent by the system to put the thread 211 to sleep and wake it up subsequently when a next task 203 arrives.

Additionally, the system can take advantage of a high performance network, such as an InfiniBand (IB) network used by the Coherence data grid. As a result, the overall latency can be dramatically reduced. In such a case, the CPU time spent to perform the two operations can contribute to a significant portion of the overall latency.

Adaptive Busy Wait

Figure 3:
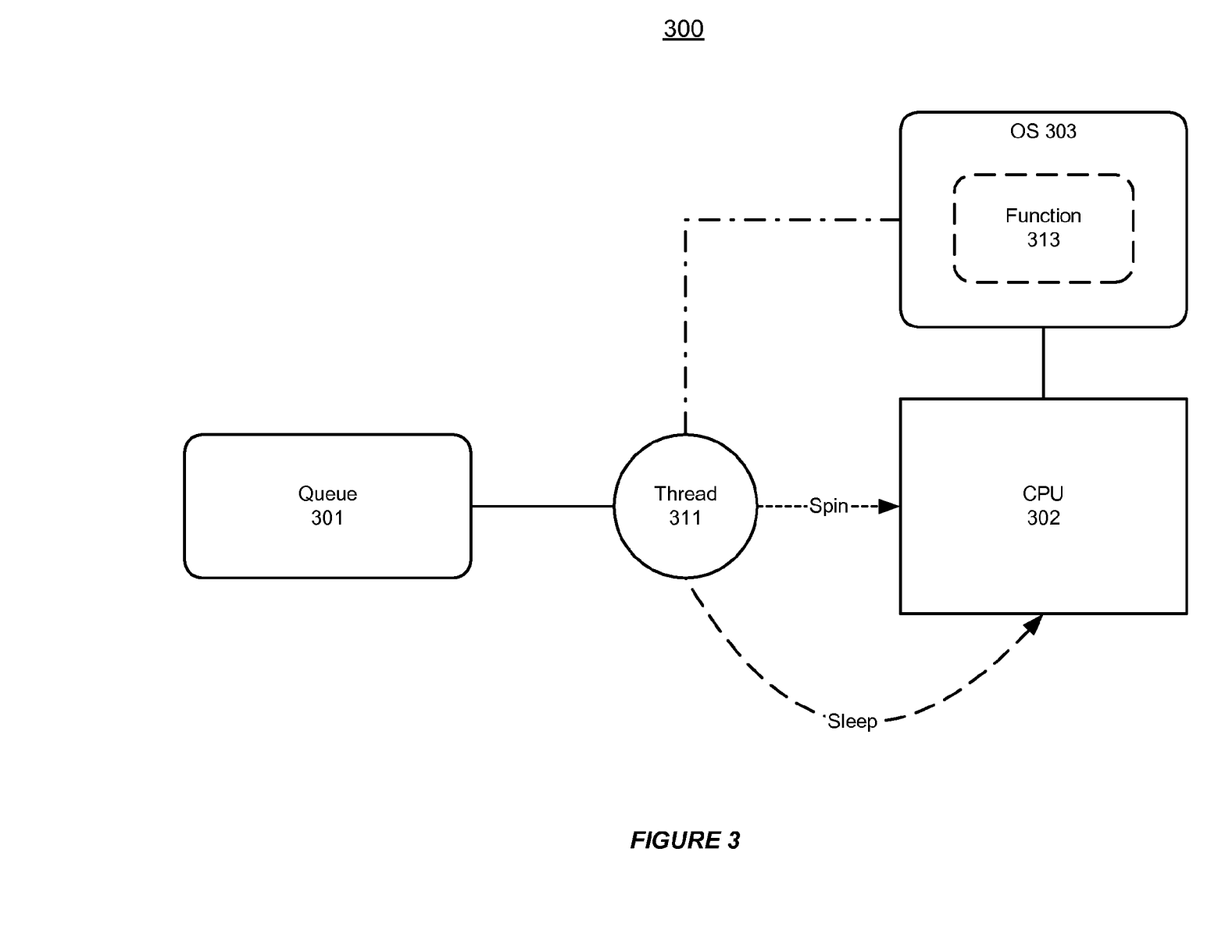
FIG. 3 shows an illustration of using an adaptive busy wait approach for managing the threads in a computing environment, in accordance with an embodiment of the invention.

FIG. 3 shows an illustration of using an adaptive busy wait approach for managing the threads in a computing environment, in accordance with an embodiment of the invention. As shown in FIG. 3, a thread 311 can be used for processing a queue 301 in a computing environment 300.

When the queue 301 is empty, the system can use an adaptive busy wait approach to determine which strategy should be used for configuring the thread 311 (i.e. deciding whether to put the thread 311 to sleep or to spin the CPU 302) while waiting for a new task arriving at the queue 301.

Using the adaptive busy wait approach, the system can obtain the total CPU time that may be needed for both putting the thread 211 to sleep and waking it up subsequently. Then, the system can first compare the total cost, for putting the thread 311 in a sleep state and waking the thread 311 up from the sleep state, with the cost, for putting the thread in the idle state by spinning the CPU 302.

Correspondingly, the system can configure the thread 311 to be in the sleep state, if the total cost for putting the thread 311 in the sleep state is smaller than the cost for putting the thread 311 in the idle state. Otherwise, the system can configure the thread 311 to be in the idle state.

As shown in FIG. 3, the system can take advantage of a function 313 provided by the operating system (OS) 303 to determine a cost for performing an operation. For example, the OS function 313, which runs on top of the CPU 302, can provide information on how much CPU time that a thread 311 has consumed. The system can estimate the cost for performing an operation by comparing the total CPU time consumed by the thread 311 before and after performing the operation.

Furthermore, the system can estimate the CPU time that the system may need to spin the CPU 302, instead of putting the thread 311 to sleep. For example, the system can obtain such information based on how long the average interval time between two consecutive tasks arriving at the queue 301.

In accordance with an embodiment of the invention, the system can configure the thread 311 adaptively based on the workload on the queue 301. For example, when the workload on the queue 301 is light, the system can configure the thread 311 to be in a sleep state while waiting for new tasks. Then, as the workload becoming heavier, the CPU time needed for keeping the CPU spinning may be reduced dramatically.

As a consequence, the system may determine that it is actually cheaper to keep the CPU 302 idle (or spinning), rather than going through the process of putting the thread 311 to sleep and waking it up subsequently after a new task arrives at the queue 301. Subsequently, when the workload turns light again later on, the system can reconfigure the thread 311 to be in a sleep state while waiting for new tasks.

Additionally, instead of using the adaptive busy wait approach, the system can set a threshold that defines how much CPU time is allowed to be wasted in spinning (i.e. in the idle state). Otherwise, the system can set the thread 211 to be in the sleep state, when the CPU time used for spinning exceeds the threshold.

Thus, the downside for this approach is that a uniform threshold may not always be optimized for a dynamic queue processing system. The uniform threshold does not prevent a portion of the CPU time, which is used for spinning, from being wasted even when the workload on the queue 301 is light and the thread 311 can be switched to run other tasks.

Figure 4:
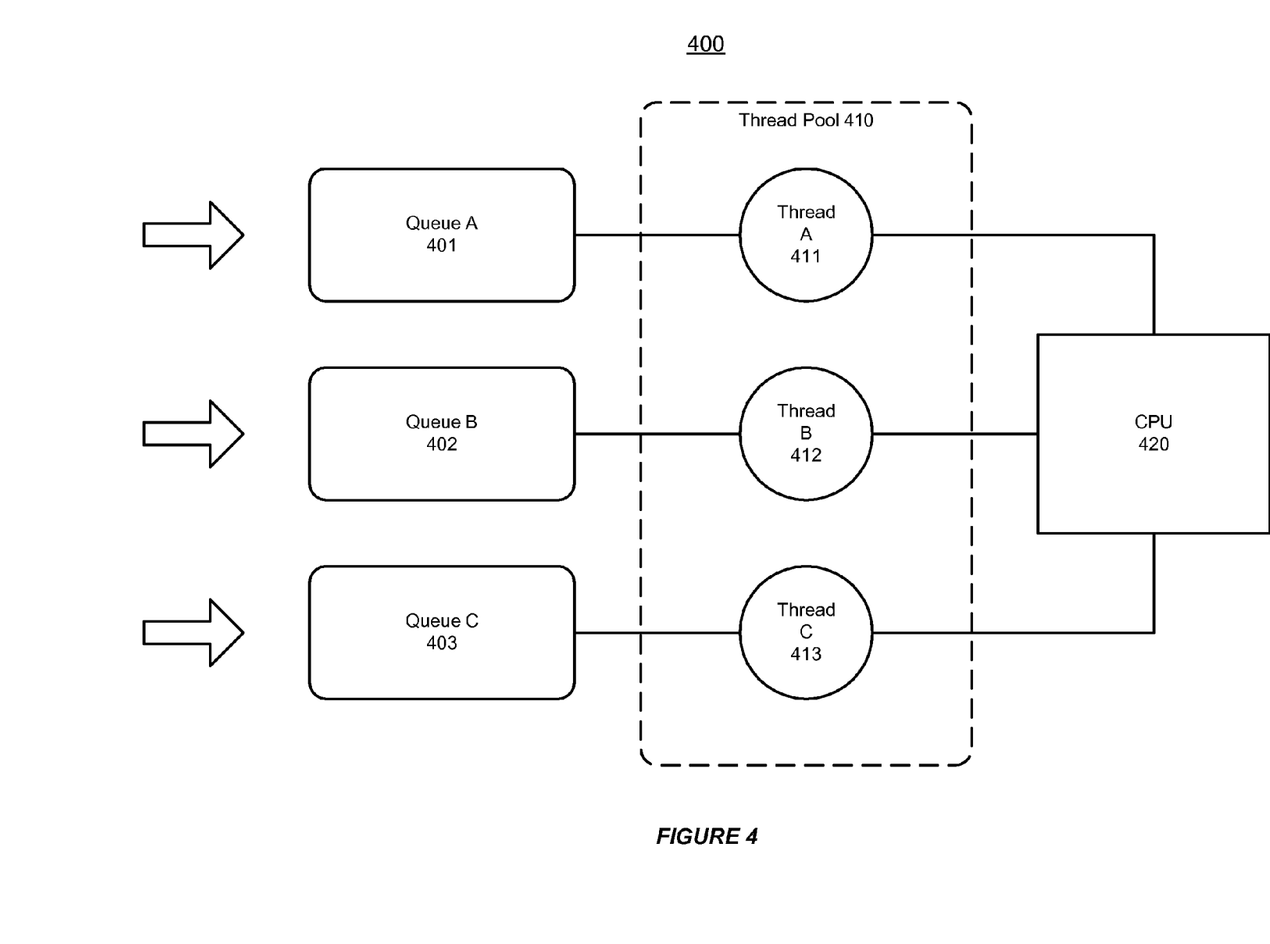
FIG. 4 shows an illustration of using a thread pool for supporting queue processing in a computing environment, in accordance with an embodiment of the invention.

FIG. 4 shows an illustration of using a thread pool for supporting queue processing in a computing environment, in accordance with an embodiment of the invention. As shown in FIG. 4, a thread pool 410 in a computing environment 400 can contain a plurality of threads, e.g. threads A-C 411-413, that runs on the CPU 420. Additionally, the thread pool 410 can be associated with a plurality of queues, e.g. queues A-C 401-403.

Furthermore, the threads A-C 411-413 can be used to process tasks arriving at the queues A-C 401-403. For each of the threads A-C 411-413 in the thread pool 410, the system can determine, independently, whether to spin the CPU 420 or put the thread to sleep while waiting for a new task to arrive in the queues A-C 401-403.

Thus, the system may allow the threads A-C 411-413 to be configured differently based on the different workload on the queues A-C 401-403.

Figure 5:
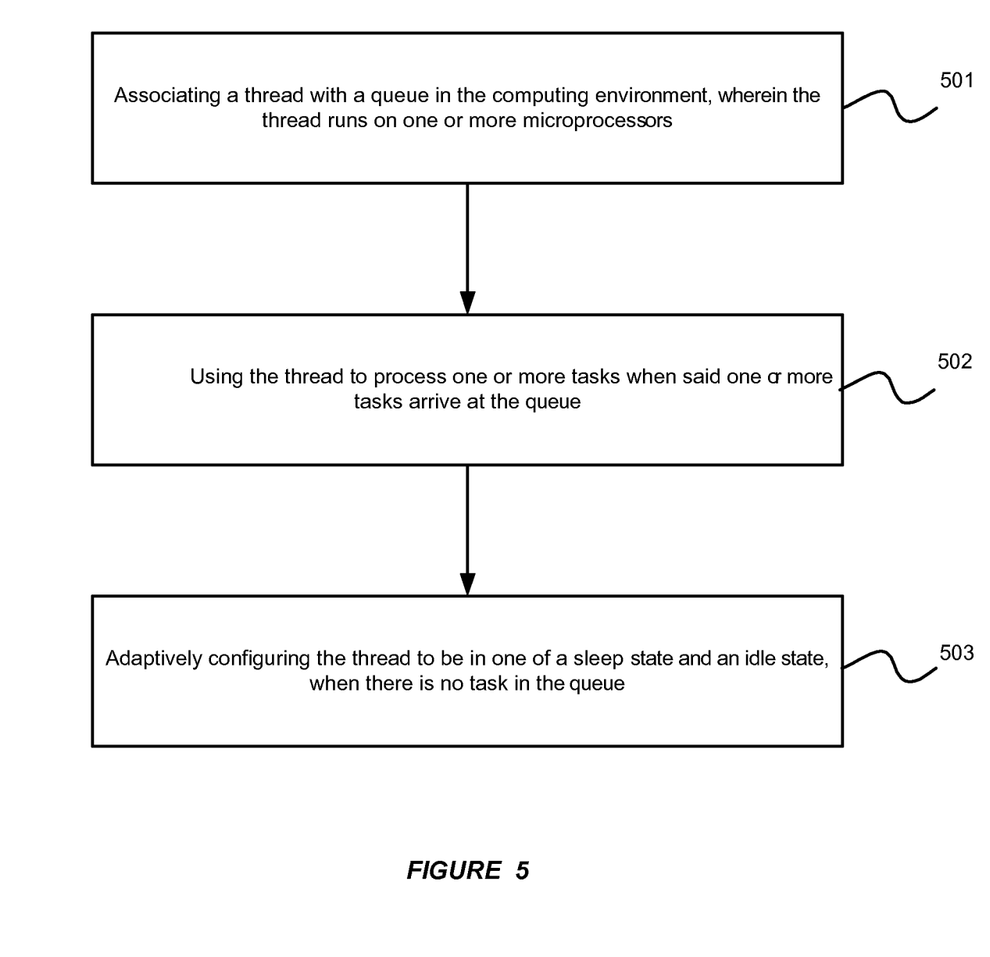
FIG. 5 illustrates an exemplary flow chart for using an adaptive busy wait approach for managing the threads in a computing environment, in accordance with an embodiment of the invention.

FIG. 5 illustrates an exemplary flow chart for using an adaptive busy wait approach for managing the threads in a computing environment, in accordance with an embodiment of the invention. As shown in FIG. 5, at step 501, the system can associate a thread with a queue in the computing environment, wherein the thread runs on one or more microprocessors. Then, at step 502, the system can use the thread to process one or more tasks when said one or more tasks arrive at the queue. Furthermore, at step 503, the system can adaptively configure the thread to be in one of a sleep state and an idle state, when there is no task in the queue.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting queue processing in a computing environment, the method comprising:
    associating a single thread with a queue in the computing environment, wherein the thread runs on one or more microprocessors;
    using the thread to process a next task from said queue if said queue is not empty;
    waiting for a next task to be received by said queue if said queue is empty;
    adaptively configuring the thread, responsive to a workload of said queue, to be in one of a sleep state and an idle state during said waiting;
    associating a single another thread with another queue in the computing environment, wherein the another thread runs on the one or more microprocessors;
    using the another thread to process another next task from said another queue if said another queue is not empty;
    waiting for another next task to be received by said another queue if said another queue is empty; and
    adaptively configuring the another thread, responsive to another workload of said another queue, to be in one of a sleep state and an idle state during said waiting;
    wherein each of said thread and said another thread are adaptively configured independently to be in the respective sleep state or idle state during said respective waiting, responsive to the workload of said queue and the another workload of said another queue.

2. The method according to claim 1, wherein adaptively configuring the thread, responsive to a workload of said queue, to be in one of a sleep state and an idle state, during said waiting comprises:
    using an operating system function to determine a total sleep state cost for putting the thread in the sleep state and awakening the thread from the sleep state;
    configuring the thread to be in said sleep state during said waiting if said total sleep state cost is less than an idle state cost for configuring the thread to be in said idle state during said waiting; and
    configuring the thread to be in said idle state during said waiting if said total sleep state cost is not less than said idle state cost for configuring the thread to be in said idle state during said waiting.

3. The method according to claim 1, further comprising:
    awakening the thread from the sleep state when a new task arrives at the queue if said thread is in said sleep state during said waiting period, and the processing said new task with said thread; and
    processing said new task immediately with said thread if said thread is in said idle state during said waiting period.

4. The method according to claim 1, wherein adaptively configuring the thread, responsive to a workload of said queue, to be in one of a sleep state and an idle state, during said waiting comprises:
    obtaining a total sleep state cost for putting the thread in the sleep state and awakening the thread from the sleep state, based on an operating system (OS) function;
    determining based on said workload of said queue an idle state cost for configuring the thread to be in said idle state during said waiting;
    comparing said total sleep state cost with said idle state cost;
    configuring the thread to be in said sleep state during said waiting if said total sleep state cost is less than said idle state cost; and
    configuring the thread to be in said idle state during said waiting if said total sleep state cost is not less than said idle state cost.

5. The method according to claim 1, wherein said idle state comprises a busy wait state in which the thread utilizes computing resources of said one or more microprocessor during said waiting.

6. The method according to claim 1, wherein adaptively configuring the thread, responsive to a workload of said queue, to be in one of a sleep state and an idle state, during said waiting comprises:
    obtaining a total sleep state cost for putting the thread in the sleep state and awakening the thread from the sleep state, based on an operating system (OS) function;
    determining an idle state cost for configuring the thread to be in said idle state during said waiting based on an average interval of time between consecutive tasks arriving at said queue;
    comparing said total sleep state cost with said idle state cost;

configuring the thread to be in said sleep state during said waiting if said total sleep state cost is less than said idle state cost; and configuring the thread to be in said idle state during said waiting if said total sleep state cost is not less than said idle state cost.

7. The method according to claim 1, further comprising:
comparing a total sleep state cost for putting the thread in the sleep state and waking the thread up from the sleep state with an idle cost for putting the thread in the idle state wherein said idle state cost is based on an average interval of time between consecutive tasks arriving at said queue.

8. The method according to claim 7, further comprising:
configuring the thread to be in a sleep state if the total sleep state cost for putting the thread in the sleep state is smaller than the idle state cost for putting the thread in the idle state; and
configuring the thread to be in an idle state if otherwise.

9. The method according to claim 6, wherein adaptively configuring the another thread, responsive to said another workload of said another queue, to be in one of a sleep state and an idle state, during said waiting comprises:
obtaining another total sleep state cost for putting the another thread in the sleep state and awakening the another thread from the sleep state, based on the operating system (OS) function;
determining another idle state cost for configuring the another thread to be in said idle state during said waiting based on an average interval of time between consecutive tasks arriving at said another queue;
comparing said another total sleep state cost with said another idle state cost;
configuring the another thread to be in said sleep state during said waiting if said another total sleep state cost is less than the another idle state cost; and
configuring the another thread to be in said idle state during said waiting if said another total sleep state cost is not less than said another idle state cost.

10. The method according to claim 8, further comprising:
comparing another total sleep state cost for putting the another thread in the sleep state and waking the another thread up from the sleep state with another idle cost for putting the another thread in the idle state wherein said idle state cost is based on an average interval of time between consecutive tasks arriving at said another queue;
configuring the another thread to be in a sleep state if the another total sleep state cost for putting the another thread in the sleep state is smaller than the another idle state cost for putting the another thread in the idle state; and
configuring the another thread to be in an idle state if otherwise.

11. A system for supporting task processing in a distributed data grid, the system comprising:
a computer system comprising one or more microprocessors and memory;
a queue in said memory and another queue in said memory;
a thread, running on the one or more microprocessors, wherein the thread is associated with said queue, wherein the thread is configured to
process a next task from said queue if said queue is not empty;
wait for a next task to be received by said queue if said queue is empty; and
enter one of a sleep state and an idle state while waiting for the next task, wherein selecting between the sleep state and the idle state is performed adaptively responsive to a workload of said queue;
another thread, running on the one or more microprocessors, wherein the another thread is associated with said another queue, wherein the another thread is configured to
process another next task from said another queue if said another queue is not empty;
wait for another next task to be received by said another queue if said another queue is empty; and
enter one of a sleep state and an idle state while waiting for the another next task, wherein selecting between the sleep state and the idle state is performed adaptively responsive to the another workload of said another queue;
wherein each of said thread and said another thread are configured to independently enter the respective sleep state or idle state during said respective waiting, responsive to the workload of said queue and the another workload of said another queue.

12. The system according to claim 11, wherein:
said thread is configured to enter the sleep state while waiting for a next task when the workload of the queue is light and enter the idle state while waiting for a next task when the workload of the queue is heavy.

13. The system according to claim 11, wherein:
said thread is configured to enter the sleep state while waiting for a next task when an average time between consecutive tasks received at said queue is long and enter the idle state while waiting for a next task when task when an average time between consecutive tasks received at said queue is short.

14. The system according to claim 11, wherein:
the thread is configured to obtain a total cost for putting the thread in the sleep state and waking the thread up from the sleep state using an operating system (OS) function.

15. The system according to claim 11, wherein:
said idle state comprises a busy wait state in which the thread utilizes computing resources of said one or more microprocessor while waiting for a next task.

16. The system according to claim 11, wherein the thread is configured to select between the idle state and the slap state by:
obtaining a total sleep state cost for putting the thread in the sleep state and awakening the thread from the sleep state, based on an operating system (OS) function;
determining an idle state cost for configuring the thread to be in said idle state during said waiting based on an average interval of time between consecutive tasks arriving at said queue;
comparing said total sleep state cost with said idle state cost;
enter said sleep state while waiting for the next task if said total sleep state cost is less than said idle state cost; and
enter said idle state while waiting for said next task if said total sleep state cost is not less than said idle state cost.

17. The system according to claim 11, wherein the thread is configured to select between the idle state and the sleep state by:
comparing a total sleep state cost for putting the thread in the sleep state and awakening the thread from the sleep state with an idle state cost for putting the thread in the idle state.

18. The system according to claim 17, wherein:
the thread is configured to enter the sleep state while waiting for the next task when the total sleep state cost for putting the thread in the sleep state is smaller than the idle state cost for putting the thread in the idle state; and
the thread is configured to enter the idle state while waiting for the next task if otherwise.

19. The system according to claim 12, wherein:
said another thread is configured to enter the sleep state while waiting for the another next task when the another workload of the another queue is light and enter the idle state while waiting for the another next task when the another workload of the another queue is heavy.

20. A non-transitory machine readable storage medium having instructions stored thereon for supporting queue processing in a computing environment, which instructions, when executed, cause a computer to perform steps comprising:
associating a single thread with a queue in the computing environment, wherein the thread runs on one or more microprocessors;
using the thread to process a next task from said queue if said queue is not empty;
waiting for a next task to be received by said queue if said queue is empty;
adaptively configuring the thread, responsive to a workload of said queue, to be in one of a sleep state and an idle state during said waiting;
associating a single another thread with another queue in the computing environment, wherein the another thread runs on the one or more microprocessors;
using the another thread to process another next task from said another queue if said another queue is not empty;
waiting for another next task to be received by said another queue if said another queue is empty; and
adaptively configuring the another thread, responsive to another workload of said another queue, to be in one of a sleep state and an idle state during said waiting;
wherein each of said thread and said another thread are adaptively configured independently to be in the respective sleep state or idle state during said respective waiting, responsive to the workload of said queue and the another workload of said another queue.

* * * * *